United States Patent [19]
Häkkinen et al.

[11] Patent Number: 6,094,576
[45] Date of Patent: Jul. 25, 2000

[54] CONNECTION ESTABLISHMENT METHOD AND RADIO SYSTEM

[75] Inventors: Hannu Häkkinen; Jere Keurulainen, both of Espoo; Zhi-Chun Honkasalo, Vantaa; Anu Virtanen; Mikko Rinne, both of Helsinki, all of Finland

[73] Assignee: Nokia Telecommunications Oy, Espoo, Finland

[21] Appl. No.: 09/011,407

[22] PCT Filed: May 26, 1997

[86] PCT No.: PCT/FI97/00316

§ 371 Date: Jan. 26, 1998

§ 102(e) Date: Jan. 26, 1998

[87] PCT Pub. No.: WO97/46041

PCT Pub. Date: Dec. 4, 1997

[30] Foreign Application Priority Data

May 27, 1996 [FI] Finland ................................. 962216

[51] Int. Cl.[7] ............................... H04Q 7/20; H04Q 7/38
[52] U.S. Cl. .......................... 455/422; 455/434; 455/450; 455/454; 455/464; 455/502; 455/507; 455/515; 370/252; 370/335; 370/342
[58] Field of Search ..................... 455/422, 432, 455/434, 450, 454, 464, 502, 509, 515, 517; 370/335, 475, 522, 336, 441, 252, 342

[56] References Cited

U.S. PATENT DOCUMENTS

| | | | |
|---|---|---|---|
| 5,511,067 | 4/1996 | Miller | 370/335 |
| 5,604,730 | 2/1997 | Tiedemann, Jr. | 370/335 |
| 5,715,236 | 2/1998 | Gilhousen et al. | 370/335 |
| 5,778,316 | 7/1998 | Persson et al. | 370/335 |
| 5,790,534 | 8/1998 | Kokko et al. | 370/335 |
| 5,818,820 | 10/1998 | Anderson et al. | 370/252 |

FOREIGN PATENT DOCUMENTS

| | | |
|---|---|---|
| 749 223 | 12/1996 | European Pat. Off. . |
| 2 293 947 | 4/1996 | United Kingdom . |

*Primary Examiner*—Fan Tsang
*Assistant Examiner*—Keith Ferguson
*Attorney, Agent, or Firm*—IP Group of Pillsbury Madison & Sutro LLP

[57] ABSTRACT

The present invention relates to a connection establishment method and a radio system. When a base station (11) detects a preamble (20) from a subscriber terminal equipment (13), the power adjustment of a closed loop is started for controlling the transmission power of the subscriber terminal equipment (13). Signals (15) of the base station (11) and the subscriber terminal equipment (13) are synchronized and the subscriber terminal equipment (13) sends a randomly selected identifier. The identifier determines a transit channel to which the subscriber terminal equipment (13) suggests to move. The base station (11) may change the suggested transit channel and echo the identifier back to the subscriber terminal equipment (13), and the base station (11) and the subscriber terminal equipment (13) communicate on the transit channel from which they move to a traffic channel. The inventive method accelerates connection establishment.

20 Claims, 4 Drawing Sheets

CONNECTION ESTABLISHMENT METHOD AND RADIO SYSTEM

This application is the national phase of international application PCT/FI97/00316 filed May 26, 1997 which designated the U.S.

FIELD OF THE INVENTION

The invention relates to a connection establishment method in a radio system including one or more base stations and subscriber terminal equipments, in which system signals to be sent are multiplied by spreading codes, and in which the connection from the base station to the subscriber terminal equipment is synchronized and the subscriber terminal equipment has received the control data of the radio system from the base station and the subscriber terminal equipment sends an access signal to the base station on an access channel.

A radio system comprising one or more base stations and subscriber terminal equipments, in which system signals to be sent are multiplied by spreading codes, and where the connection from the base station to the subscriber terminal equipment is synchronized and the subscriber terminal equipment has received the control data of the radio system from the base station and the subscriber terminal equipment is arranged to send an access signal to the base station on an access channel.

BACKGROUND OF THE INVENTION

A typical cellular radio system, such as the CDMA system (Code Division Multiple Access) comprises a set of subscriber terminal equipments and base stations. When a subscriber terminal equipment does not have a connection on a normal traffic channel, it monitors the paging channel of a base station and when necessary, sends messages on an access channel to the base station. When a connection is established between the subscriber terminal equipment and the base station in a cellular radio system, either the subscriber terminal equipment or the base station sends a connection establishment request. In the CDMA cellular radio system, a specific Random Access Channel (RACH) is used as an access channel on which the subscriber terminal equipment initiates call establishment. The base station responds to the messages of the access channel on an Access Grant Channel (AGCH). In this case one phase is selected from among all the available phases of a pseudonoise code for a random access type connection. When a traffic channel connection is to be established or when responding to a connection establishment request of the base station, the terminal equipments send via the access channel a connection establishment message to the base station which forwards it to other parts of the system, typically to a base station controller where traffic channel resources are allocated to the connection.

In the CDMA system, each base station sends continuously a pilot signal. If the base station has several sectors or beams, each sector or beam of the base station has typically a specific pilot signal. It is previously known to use a pilot signal for identifying a base station, a beam or sector of the base station. A pilot signal is a spread-coded signal without data modulation which signal each base station sends continuously to its coverage area. The terminal equipment may identify the base station transceiver units by the pilot signal because the phases of the spreading codes in the pilot signal differ from one another. The subscriber terminal equipments carry out measurings of pilot signals continuously.

In a typical CDMA system using direct sequence, the transmitter and the receiver have to be synchronized so that the sequence of the received signal and the sequence of the local oscillator are in the same phase. Continuous code channels, such as the pilot channel, can be used for synchronization in the direction of transmission from the base station to the subscriber terminal equipment. The subscriber terminal equipment can search for the code phase and thus synchronize to the transmission of the base station. In the opposite direction of transmission from the subscriber terminal equipment to the base station, the subscriber terminal equipment starts the transmission and the base station searches for the code phase. In the direction of transmission from the subscriber terminal equipment to the base station a problem is caused by the distance of the subscriber terminal equipment from the base station, that is, by a near-far problem. In that case, the subscriber terminal equipment has to estimate the suitable transmission power. The base station cannot, however, control the transmission power of the subscriber terminal equipment until it has synchronized itself to the correct code phase.

In addition to a circuit-switched connection, the base station and the subscriber terminal equipment can communicate also on a packet-mode connection which is used in the PRMA system (Packet Reservation Multiple Access). In that case the channel needed for sending the signal is only reserved for the duration of the signal at that moment and it is released immediately when the signal is discontinuous or when it ends or has a break. If the signal is sent discontinuously, the connection is synchronized and the channel is reserved again after each break. In a packet-mode transmission, a transfer from one carrier frequency to another and the re-establishment of a connection require a fast access process.

The prior art access process, which typically lasts hundreds of milliseconds, restricts by its slowness the performance of the radio system and strains the resources. Furthermore, as the establishment of a connection takes a long time and the transmission power of the subscriber terminal equipment cannot be controlled during that time, the subscriber terminal equipment causes interferences in the radio system.

CHARACTERISTICS OF THE INVENTION

The object of the present invention is to implement fast synchronization for the base station to the transmission of the subscriber terminal equipment when establishing a connection. A further object is to have the transmission power of the subscriber terminal equipment fast under the control of the base station.

This object is attained by a method shown in the prior art portion which is characterized in that when establishing a connection, the subscriber terminal equipment transmits on the access channel essentially at most: a preamble including sync data of the spreading code, a timing sync portion which includes a synchronization word and with which at least an identifier is interpreted, and an identifier including at least data on the subscriber terminal equipment.

The radio system of the invention is characterized in that the access signal of the subscriber terminal equipment comprises: a preamble comprising sync data of the spreading code, a timing sync portion which includes a synchronization word and with which at least an identifier is interpreted, and an identifier comprising at least data on the subscriber terminal equipment.

Considerable advantages are attained with the method of the invention. It accelerates connection establishment and diminishes interference by having the subscriber terminal equipment fast under power adjustment control of the base station, for example.

BRIEF DESCRIPTION OF THE FIGURES

In the following, the invention will be explained in more detail with reference to the appended drawings, wherein.

DESCRIPTION OF THE PREFERRED EMBODIMENTS

The solution of the invention is particularly suitable to be used in the CDMA system without restricting thereto. In the following, the invention will be described in more detail by using the CDMA system as an example.

Figure 1:
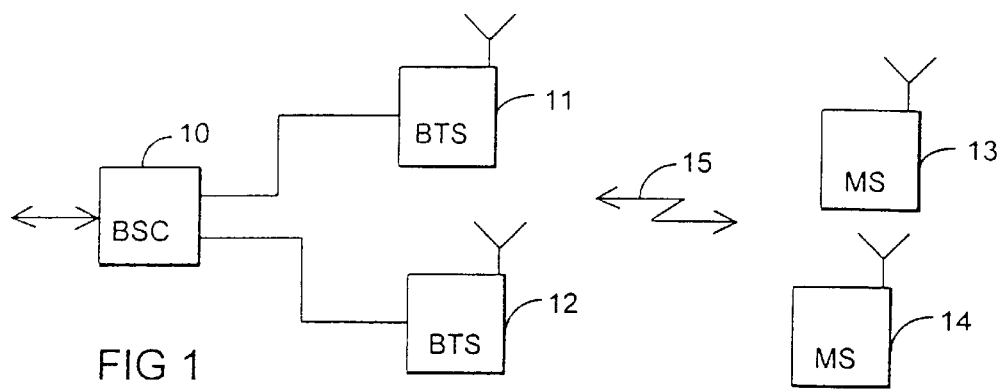
FIG. 1 shows the radio system.

FIG. 1 shows a typical radio system, preferably a cellular radio system comprising a base station controller 10, base stations 11 and 12 and subscriber terminal equipments 13 and 14. The subscriber terminal equipments 13 and 14, which are preferably mobile phones, are connected to the base stations 11 and 12 whose coverage areas form cells. Signalling between the base stations 11 and 12 and the subscriber terminal equipments 13 and 14 is illustrated in FIG. 1 by a two-headed arrow with numeral 15. The signals 15 to be sent are formed by multiplying data by the spreading code. The signals of the subscriber terminal equipments 13 and 14 are differentiated from one another by the mutual phase difference of the spreading codes or by different codes. The base stations 11 and 12 send signals which are transmitted by the base station controller 10. The base stations 11 and 12 forward the signals received from the subscriber terminal equipments 13 and 14 to the base station controller 10. The connection of the base stations 11 and 12 to the base station controller 10 typically takes place by a digital transmission link. The base station controller 10 is connected to other parts of the network, such as the mobile services switching centre (not shown in the figure) from which there are typically connections to other mobile services switching centres and to exchanges of other networks.

Figure 2:
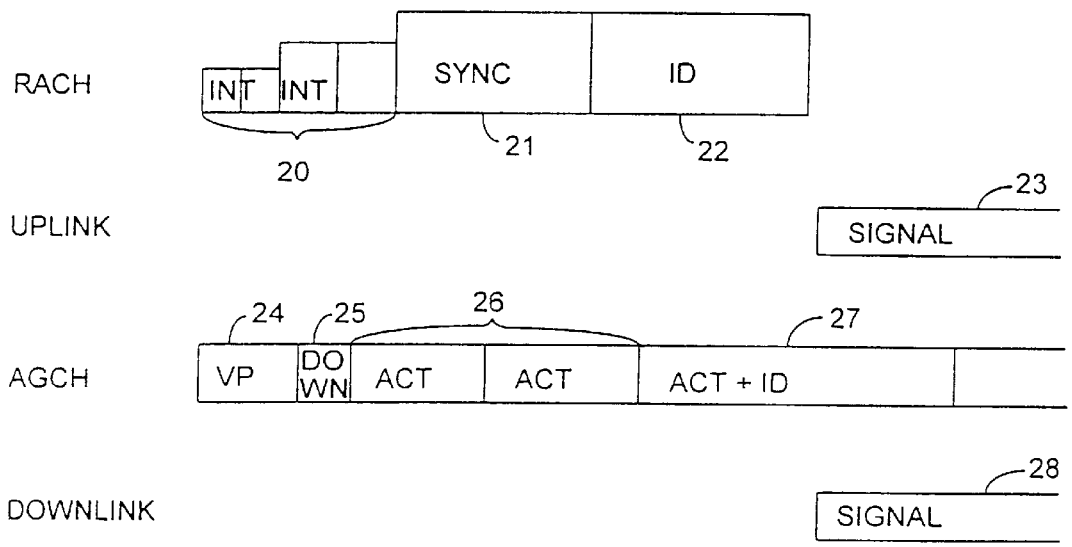
FIG. 2 shows an access process.

The access signal is examined in more detail by means of FIG. 2. In the solution of the invention, when the downlink connection is already synchronized, the subscriber terminal equipment 13 transmits repeatedly a short preamble 20 on access channel RACH on an increasing transmission power as long as the base station 11 will hear it. When the base station 11 does not hear the transmission of the subscriber terminal equipment 13, the base station 11 transmits a "power-up" command 24. When the base station 11 detects the preamble 20 on the RACH channel, the base station 11 transmits a "power-down" command 25 and the transmission power of the subscriber terminal equipment 13 is transferred to a closed loop adjustment 26 in the inventive solution known per se in the prior art. When the subscriber terminal equipment 13 detects the "power-down" command, which is an indication of the base station 11 having successfully received the preamble 20 of the access signal, it transmits preferably a sync portion comprising a synchronization word 21. By means of the synchronization word 21, at least the timing of the initial part and end part of the identifier 22 are synchronized. The synchronization word typically gives an unequivocal reference time for the uplink connection to be established. By means of it, it is possible to interpret the identifier 22 and the allowed starting points of the transit channel. By means of the synchronization word, the base station 11 finds out the signal timing the subscriber terminal equipment 13 uses in its uplink connection. After this the subscriber terminal equipment 13 also transmits the identifier 22 which determines the subscriber terminal equipment that transmits it. This takes place for example so that the subscriber terminal equipment 13 selects a random identifier which the base station 11 repeats. Thus it is confirmed that the subscriber terminal equipment 13 and the base station 11 follow one another. In the solution of the invention, the identifier also suggests a specific inventive transit channel to be used. This suggestion may be implemented for example so that the transit channel is a function or a relation of the identifier 22. A typical solution would be for example such that a specific transit channel is tabulated for a specific identifier 22. After this the connection of the base station 11 and the subscriber terminal equipment 13 is moved to the transit channel and therefrom further to a traffic channel (not shown in FIG. 2).

By means of the identifier, the inventive transit channel is determined in the method, to which channel transit occurs from the access channel RACH. The purpose of using the transit channel is to release the access channel as fast as possible for new connection establishment. After having received the access channel RACH, the base station 11 acknowledges it by an "access granted" signal on the AGCH channel (Access Grant Channel). This "access granted" signal AGCH contains, when needed, correction data on the transit channel if the transit channel suggested by the subscriber terminal equipment 13 is reserved or otherwise unsuitable. By means of the correction data, the subscriber terminal equipment 13 can move to the correct transit channel. The correction data contains as little as possible information, 2 bits being sufficient, for example. If no transit channel can be allocated to the use of the subscriber terminal equipment 13, the connection is broken off and the connection establishment can start again.

Either a short or a long spreading code can be used for spreading the access signal in the solution of the invention. When using a short spreading code at least with the preamble 20, the synchronization word 21 and the identifier 22 can also be spread with a short spreading code. The preamble 20 is actually preferably no more than a short spreading code. The short spreading code comprises at most only hundreds of spreading codes, that is, chips, whereas the long spreading code of the prior art typically contains tens of thousands of chips or even considerably more. A short spreading code allows a simpler receiver structure than a long spreading code.

When using a long spreading code, it is not necessary in the solution of the invention to move from the access channel to the transit channel as the known starting point of the long code determines the synchronization and independent connection-specific channel where signalling can be continued. A long spreading code can be used all the time or it can be enabled after the preamble 20, the synchronization word 21 or the identifier 22. The use of the transit channel is also possible even in this case. It is most significant at this stage of the inventive solution that the access channel and generally the organization channel and the resources connected thereto are released for other connections.

The subscriber terminal equipment 13 measures the pilot signals of the base stations 11 and 12, whereby the subscriber terminal equipment 13 can estimate the path loss and make an estimate of the transmission power of the access signal. A clearly smaller power than the estimated required power is typically used at first as a transmission power in order to avoid interferences. In the implementation of the invention, the subscriber terminal equipment 13 selects preferably as the transmission power a random power below the estimated required power. In this way it is possible to randomize the detection of several subscriber terminal equipments which establish a connection at the same time at the base station.

As the preamble 20 of the access signal does not yet inform the base station from which subscriber terminal equipment the access signal is received, the base station may accept access signals of several subscriber terminal equipments at the same time in the solution of the invention. The base station differentiates the subscriber terminal equipments from one another on the basis of the phase of the spreading code, which is particular for each subscriber terminal equipment due to the distance between the base station and the subscriber terminal equipment, for example. The base station may continue establishing a connection in parallel with several subscriber terminal equipments. In practice, the access channel is common as only the echoing of the identifier is specific for each subscriber terminal equipment. This is correct for both short and long spreading codes. Especially when using a short spreading code, it is possible but only with a low probability that both the spreading code and the phase of the spreading code of two subscriber terminal equipments are the same, in which case a collision occurs. If this should occur, the connection establishment of the collided subscriber terminal equipments is started again. The collision probability can be diminished by using a long spreading code or even several, possibly long spreading codes, but their use will complicate the receiver structure.

In the solution of the invention, it is possible to map the identifier 22 and the transit channel in many ways. They can be arranged as a table in which case a specific identifier 22 corresponds to a specific transit channel. A mapping rule on the system level may also be used. In that case a pilot signal, for example, defines the transit channels used in each cell, from which channels the subscriber terminal equipment is able to select. There may also be fewer transit channels in use than identifiers 22 since a great number of identifiers 22 diminishes the risk of collision, whereas the number of transit channels is dependent on the capacity of the system.

When the connection has just been switched off, especially in a packet-mode transmission, and the connection is to be established again with the same base station 11 and the subscriber terminal equipment 13, the base station 11 uses a narrower time window than usual, from which it searches for the access signal of the subscriber terminal equipment 13, because the phase delay of the spreading code in the previous connection is kept in memory for some time. The time window is the delay interval of the spreading code from which the base station 11 searches for the subscriber terminal equipment 13. Also, the power level of the previous connection is utilized in such a manner that the receiver of the base station 11 waits for a similar signal power level as at the end of a previous connection, corrected by a possible modification of connection attenuation. The subscriber terminal equipment 13 can detect this modification by measuring the change in the strength of the pilot signal. In that case the power level is typically greater than at any other time at the beginning of the connection.

In the solution of the invention, the receiver of the base station 13 detects all the possible phases of the spreading code at the same time, in which case synchronization is very fast when signal strength is high enough. A typical receiver meeting the requirement of the invention may comprise a filter, for example, that forms a correlation to all phases of the spreading code at the same time. A delay producing the greatest correlation reveals the phase of the spreading code. Correlation $C[\tau]$ can be calculated, for example, with the formula $$C[\tau] = \int_a^b S[t] \cdot M[t+\tau] dt,$$

where a and b represent moments of time, $S[t]$ is a received signal and $M[t+\tau]$ comprises all the combinations of the spreading code with delay $\tau$. In the case of digital signals, the integral can be replaced by summing.

Prior art diversity combination technique can also be used in the receiver, in which case signal energy can be gathered better and signal noise rate can be improved. In such multipath reception, the most ordinary diversity receivers combine signals before or after detection and they comprise selective combining, maximal-ratio combining and equal-gain combining, for example.

Figure 3:
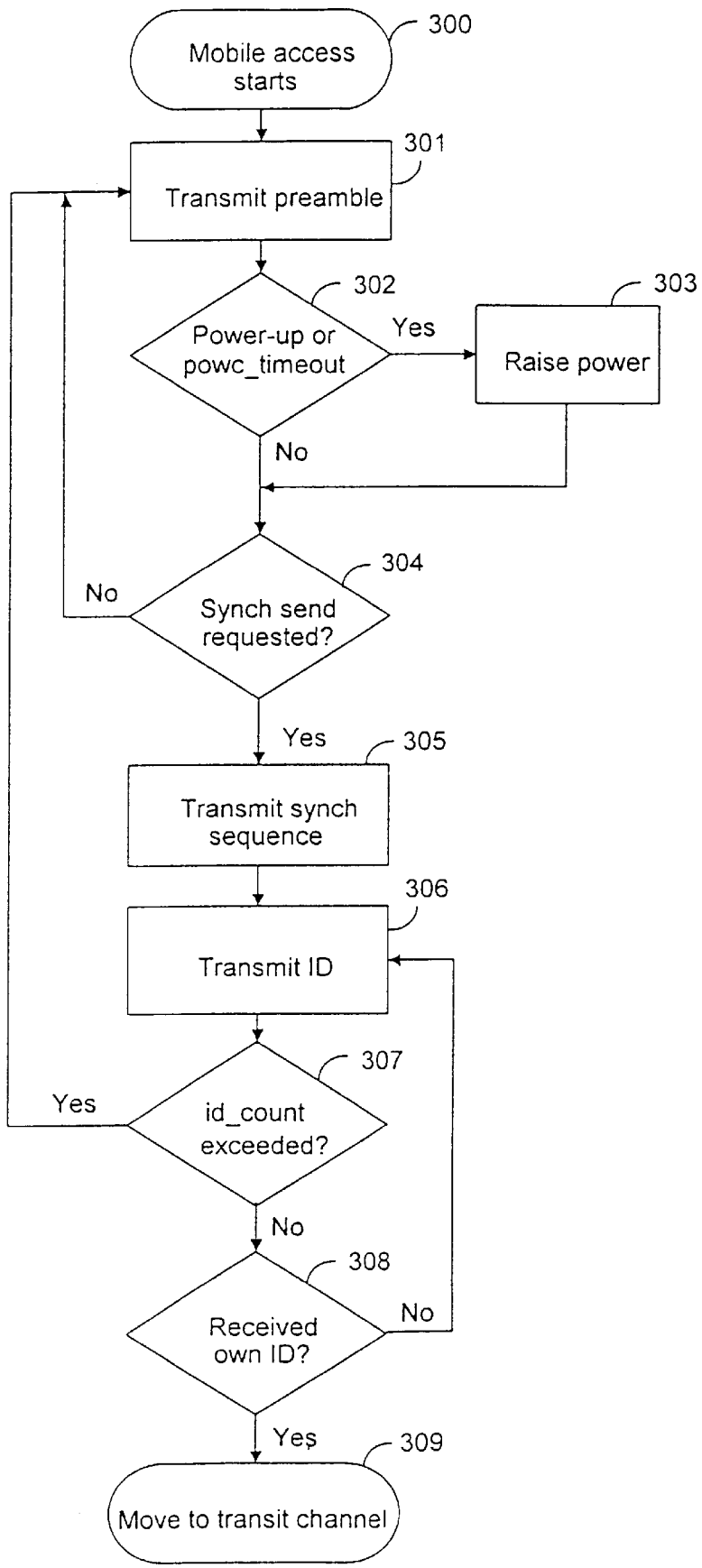
FIG. 3 shows a flow diagram of the operation of the subscriber terminal equipment.

The typical process of the invention is now examined more closely in flow diagrams 3 and 4. FIG. 3 illustrates a flow chart of the operation of the subscriber terminal equipment in the inventive connection establishment. When the subscriber terminal equipment starts establishing the connection on the RACH channel, the initial situation is 300. Then the subscriber terminal equipment transmits a preamble in step 301. After this the subscriber terminal equipment remains a restricted period of time in step 302, waiting for a "power-up" command. If the base station requires more transmission power, the subscriber terminal equipment moves to state 303 where it raises its transmission power. This state is abandoned after the transmission power is suitable for the base station. If the waiting time is exceeded in step 302 or state 303 has been abandoned, step 304 is moved to where the subscriber terminal equipment waits for a sending request of a synchronization word from the base station. If the request is not received, the subscriber terminal equipment moves back to state 301 where it sends the preamble. If the request is received, the subscriber terminal equipment sends a synchronization word in step 305. This request is preferably also information on that the base station starts to control the transmission power of the subscriber terminal equipment. Alternatively, the base station informs of starting power adjustment on a response channel. After this in step 306 the subscriber terminal equipment sends an identifier (ID) it has selected at random, and the subscriber terminal equipment remains waiting in step 307 for the echoing of the identifier from the base station. If the base station does not repeat the identifier during waiting in 307, the subscriber terminal equipment is restored to the transmitting state 301 of the preamble. If the subscriber terminal equipment receives a wrong identifier, the subscriber terminal equipment moves to state 306 where it sends the identifier again. If the base station echoes the identifier correctly, the subscriber terminal equipment moves to state 309 where the subscriber terminal equipment moves to the transit channel and releases the RACH channel for other users.

Figure 4:
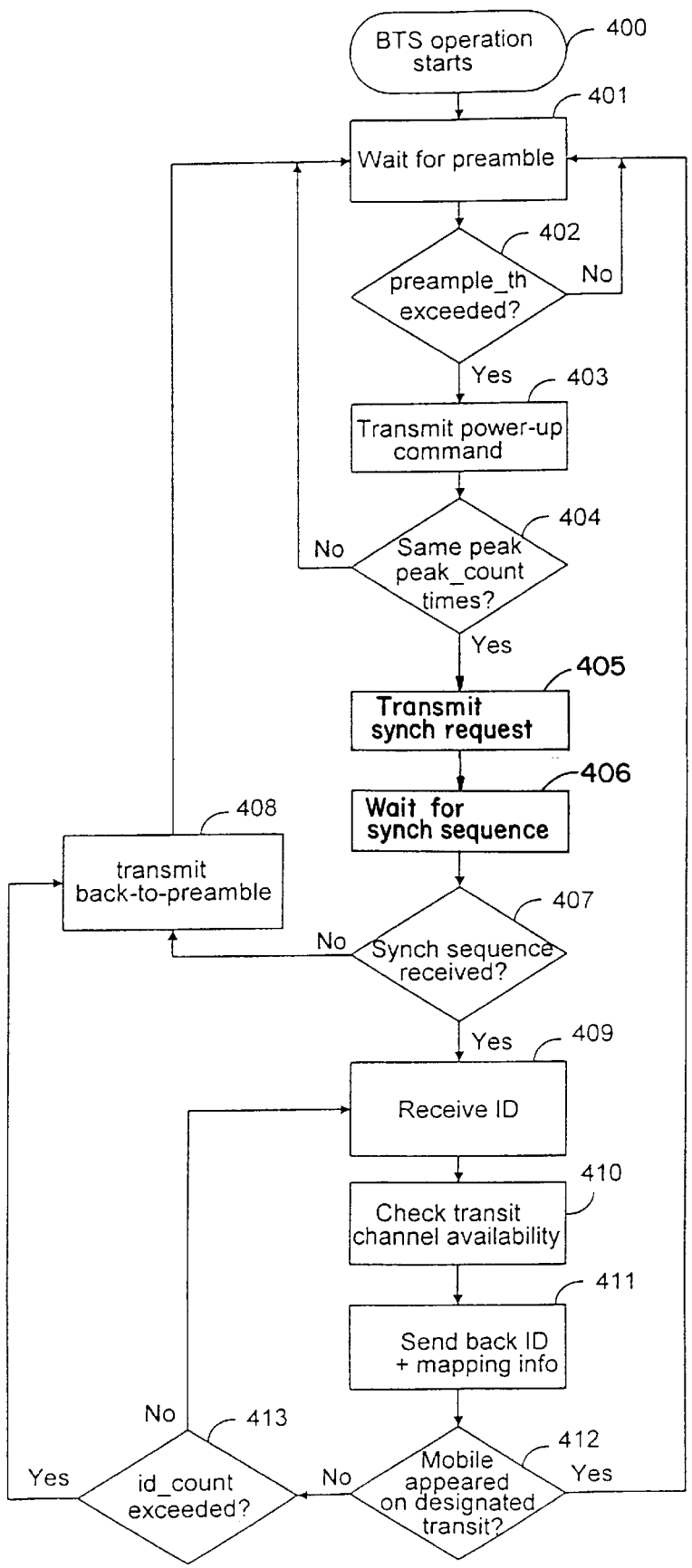
FIG. 4 shows a flow diagram of the operation of the base station.

FIG. 4 shows a flow diagram of the operation of the base station in inventive connection establishment. The operation of the base station starts in step 400 at the beginning of the flow diagram. There the base station waits for the preamble of the access signal of the subscriber terminal equipment. In step 402 it is tested if the received signal exceeds a threshold value. If this is not the case, waiting is continued in step 401. If the signal was detected, a "power-up" command is sent in step 403 and in step 404 it is compared if after power has been raised, the correlation is the same as when the signal is detected. If the correlation is at a different point, power adjustment was not done for the detected subscriber terminal equipment and it returns to the start to wait in step 401. If the correlation is at the same place, the subscriber terminal equipment is requested the synchronization word in step 405, after which the base station remains waiting in step 406. If the synchronization word is not received in step 407, step 408 is moved to where the base station informs that it moves to the initial state in step 401 to wait. If the synchronization word is received within the allowed time, the base station receives it in step 409. After that the base station checks the availability of the transit channel in step 410. When the transit channel is available, the base station moves further to state 411 from which it sends the identifier of the subscriber terminal equipment back for checking. At the same time it can change by mapping the transit channel suggested by the subscriber terminal equipment. Next the base station stays waiting in step 412 for the appearance of the subscriber terminal equipment on a specified transit channel. If the subscriber terminal equipment does not appear on the transit channel within the allowed time in step 413, the base station moves to state 408. If the subscriber terminal equipment does not appear on the transit channel but there is some of the allowed time left, the base station may move to state 409 where it receives the identifier again. Otherwise the base station moves to wait for the new preamble and in a successful case serves a subscriber terminal equipment that has just left the RACH channel on a transit channel where it can receive the identifier again. Other signalling, such as a response to a paging message, needed in connection establishment, is started on the transit channel. When necessary, moving to an actual traffic channel is also agreed upon there. Thus also the transit channel is released to be used again.

Figure 5:
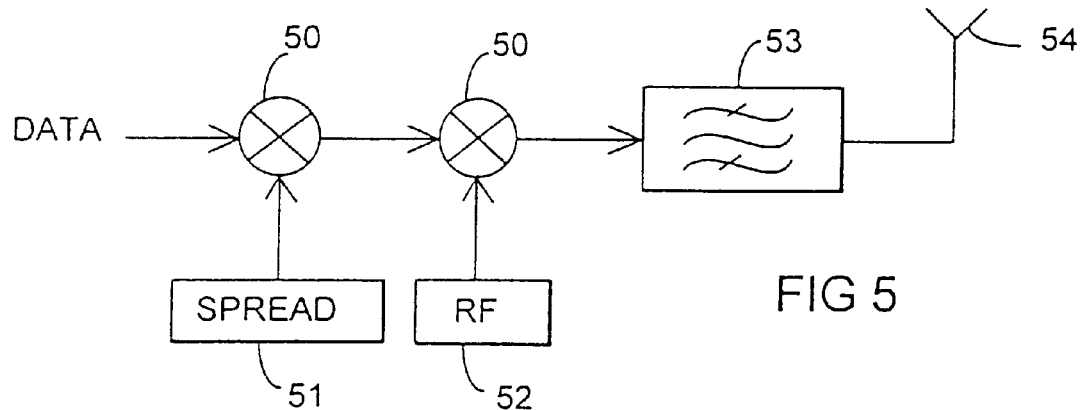
FIG. 5 shows a transmitter.

FIG. 5 shows the main features of a base station transmitter which comprises a multiplier 50, a spreading code generator 51, radio frequency means 52, a filter 53 and an antenna 54. Digital data sent by the base station is first received by the multiplier 50 where data is multiplied, that is, spread according to prior art by a digital spreading code of the spreading code generator 51. Spreading code chips are shorter than data bits. The spread signal propagates to a second multiplier 50 where the digital signal is multiplied by a high-frequency carrier wave. After this at least low frequencies are removed from the high-frequency signal by the filter 53 from which the signal propagates to the antenna 54. The spreading code of the spreading code generator 51 can be long or short.

Figure 6:
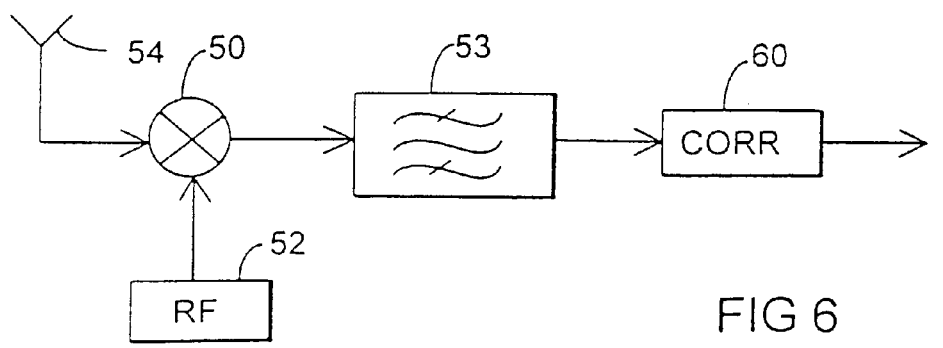
FIG. 6 shows a receiver.

FIG. 6 shows the main features of a base station receiver. Similarly as the transmitter, the receiver comprises an antenna 54, a filter 53, a multiplier 50, and RF means 52. The receiver also comprises a correlator 60. The frequency of a radio-frequency signal received from the antenna 54 is transferred to a low intermediate frequency by using the multiplier 50 where the signal is multiplied by oscillator radio frequency, and the filter 53. After this, the correlator searches for the transmitted bits or bit combinations from the received signal. In the solution of the invention, the correlator is such that it can detect all the phases of the spreading code at the same time. In that case the long spreading code makes it more complicated than a short spreading code. The signal propagates from the correlator 60 to other parts of the base station.

The implementation of the invention employs known radio technique and digital signal processing circuits which are ASIC or VLSI based and whose operation can be controlled by means of software by microprocessor technique.

Although the invention has been explained above with reference to the examples of the appended drawings, it is evident that the invention is not restricted thereto, but it can be modified in various ways within the scope of the inventive idea disclosed in the accompanying claims.

What is claimed is:

1. A connection establishment method in a radio system including at least one base station and a plurality of subscriber equipment, the method comprising:

multiplying system signals, to be sent, by spreading codes;

synchronizing a connection from a base station of the at least one base station to a subscriber terminal equipment of the plurality of subscriber terminal equipment;

receiving, by the subscriber terminal equipment, control data of the radio system from the base station;

sending of an access signal by the subscriber terminal equipment to the base station on an access channel, wherein:

when establishing a connection, the subscriber terminal equipment transmits on the access channel essentially at most:

a preamble including sync data of a spreading code, an identifier including at least data on the subscriber terminal equipment, and a timing sync portion including a synchronization word, at least the identifier being interpreted by using the synchronization word, wherein:

the preamble is sent as long as the base station detects the preamble and a power adjustment of a closed loop is started to keep transmission power of the subscriber terminal correct, starting of the power adjustment of the closed loop informing the subscriber terminal that reception of the preamble of the access signal is successful.

2. A method according to claim 1, further comprising:

moving from the access channel to a transit channel, and determining the transit channel in a previously known manner on the basis of the identifier and using the transit channel before moving to a traffic channel.

3. A method according to claim 2, further comprising:

when the transit channel of the identifier is unsuitable, the base station changing the transit channel into a suitable one and informing the subscriber terminal equipment of the changing, and when the changing is impossible, the connection is switched off and connection establishment is started again.

4. A method according to claim 3, further comprising:

when the transmit channel of the identifier is unsuitable and when the transit channel is changed into the suitable one, the base station sending information about the suitable one by a few bits to the subscriber terminal equipment.

5. A method according to claim 1, wherein a short spreading code is used for spreading at least the preamble.

6. A method according to claim 1, wherein when using a long spreading code for the timing sync portion and for the identifier for sending the access signal, signalling is continued with said long spreading code.

7. A method according claim 1, wherein the subscriber terminal equipment sends the access signal so that a randomly selected transmission power is used at first.

8. A method according to claim 1, wherein the base station is connected on the access channel to the plurality of subscriber terminal equipment when sending the access signal, wherein:

the plurality of subscriber terminal equipment are differentiated from one another by phases of a spreading code, and the differentiation of the plurality of subscriber terminal equipment takes place on the basis of the respective identifier of each of the subscriber terminal equipment.

9. A method according to claim 1, wherein when a timing window is a delay interval of a spreading code from which the base station searches for a signal soon after having switched off the connection, when connection establishment is started again, a smaller timing window is used in a receiver of the base station and a greater than usual amount of transmission power is expected of the subscriber terminal equipment.

10. A method according to claim 1, wherein the base station detects essentially all the phases of a spreading code in use at the same time.

11. A radio system comprising:

at least one base station; and a plurality of subscriber equipment, wherein:

system signals to be sent are multiplied by spreading codes, a connection from a base station of the at least one base station to a subscriber terminal equipment of the plurality of subscriber terminal equipment is synchronized, the subscriber terminal equipment receives control data of the radio system from the base station, the subscriber terminal equipment is arranged to send an access signal to the base station on an access channel, the access signal of the subscriber terminal equipment comprises:

a preamble including sync data of a spreading code, an identifier including at least data on the subscriber terminal equipment, and a timing sync portion including a synchronization word, at least the identifier being interpreted by using the synchronization word;

a power adjustment of a closed loop is arranged to be started after detection of the preamble at the base station to keep transmission power of the subscriber terminal correct, and starting of the power adjustment of the closed loop informing the subscriber terminal that reception of the preamble of the access signal at the base station is successful.

12. A radio system according to claim 11, wherein a transit channel to which a moving of a connection from the access channel is arranged, is determined in a predetermined manner on the basis of the identifier and the transit channel is arranged to be used before moving to the traffic channel.

13. A radio system according to claim 11, wherein a transit channel of the identifier is unsuitable, the base station is arranged to change the transit channel into a suitable ones, and when a change of the transit channel is impossible, the base station is arranged to switch off the connection and connection establishment is arranged to be started again.

14. A radio system according to claim 13, wherein when a transit channel of the identifier is unsuitable and when the transit channel is changed into a suitable one, the base station is arranged to send information about the suitable one by a few bits to the subscriber terminal equipment.

15. A radio system according to claim 11, wherein at least the preamble is spread by a short spreading code.

16. A radio system according to claim 11, wherein when the timing sync portion and the identifier have been spread by a long spreading code, signalling is arranged to be continued with said long spreading code.

17. A radio system according to claim 11, wherein the subscriber terminal equipment is arranged to send the access signal at a randomly selected transmission power at first.

18. A radio system according to claim 11, wherein the base station is arranged to be connected on the access channel to several of the plurality of subscriber terminal equipment when sending the access signal, wherein:

there are differences between phases of a spreading code of the several subscriber terminal equipment, and a differentiation of the several subscriber terminal equipment is arranged to take place on the basis of the respective identifier of each of the several subscriber terminal equipment.

19. A radio system according to claim 11, wherein when a timing window is a delay interval of a spreading code from which the base station searches for a signal, and when connection establishment is started again soon after having switched off the connection, the timing window is arranged to be smaller and the expected transmission power of the subscriber terminal equipment greater than usual.

20. A radio system according to claim 11, wherein the base station is arranged to detect at the same time all phases of a spreading code in use.

* * * * *